United States Patent
Friedman

(10) Patent No.: US 7,075,413 B2
(45) Date of Patent: *Jul. 11, 2006

(54) REFERENCE CIRCUIT ENHANCEMENT FOR PASSIVE RFID TAGS

(75) Inventor: Daniel J. Friedman, Tarrytown, NY (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/121,909

(22) Filed: May 3, 2005

(65) Prior Publication Data

US 2005/0200458 A1    Sep. 15, 2005

Related U.S. Application Data

(63) Continuation of application No. 10/386,138, filed on Mar. 11, 2003, now Pat. No. 6,906,615, which is a continuation of application No. 09/383,648, filed on Aug. 26, 1999, now abandoned.

(60) Provisional application No. 60/100,719, filed on Sep. 17, 1998.

(51) Int. Cl.
  *H04Q 5/22*  (2006.01)
  *G05F 3/02*  (2006.01)
(52) U.S. Cl. ..................... 340/10.4; 327/538
(58) Field of Classification Search ............. 340/10.4, 340/10.5, 10.51
See application file for complete search history.

(56) References Cited

U.S. PATENT DOCUMENTS

| 5,781,061 | A | * | 7/1998 | Miyashita et al. | .......... 327/538 |
| 5,912,632 | A | * | 6/1999 | Dieska et al. | .............. 340/10.5 |
| 6,906,615 | B1 | * | 6/2005 | Friedman | .................. 340/10.4 |

* cited by examiner

*Primary Examiner*—Wendy R. Garber
*Assistant Examiner*—Clara Yang
(74) *Attorney, Agent, or Firm*—O'Melveny & Myers LLP

(57) ABSTRACT

A passive RF tag is disclosed in which the tag contains a tag oscillator for determining the modulation frequency of modulating the backscatter signal, and the tag oscillator frequency is stabilized when the tag modulates the backscatter signal.

13 Claims, 2 Drawing Sheets

REFERENCE CIRCUIT ENHANCEMENT FOR PASSIVE RFID TAGS

CROSS REFERENCE TO RELATED APPLICATIONS

This patent application is a continuation of application Ser. No. 10/386,138, filed Mar. 11, 2003, now U.S. Pat. No. 6,906,615 which was a continuation of application Ser. No. 09/383,648, filed Aug. 26, 1999, now abandoned. This patent application also claims priority pursuant to 35 U.S.C. 119(e) to the following U.S. Provisional Applications: Application No. 60/100,719, filed Sep. 17, 1998, all of the above applications being incorporated herein by reference in therein entirety including incorporated material.

FIELD OF THE INVENTION

The field of the invention is the field of Radio Frequency (RF) transponders (RF Tags) which receive RF electromagnetic radiation from a base station and send information to the base station by modulating the load of an RF antenna. Such transponders are alternatively called radio frequency identification transponders (RFID tags).

BACKGROUND OF THE INVENTION

RF Tags can be used in a multiplicity of ways for locating and identifying accompanying objects, items, animals, and people, whether these objects, items, animals, and people are stationary or mobile, and transmitting information about the state of the of the objects, items, animals, and people. It has been known since the early 60's in U.S. Pat. No. 3,098,971 by R. M. Richardson, that electronic components on a transponder could be powered by radio frequency (RF) power sent by a "base station" at a carrier frequency and received by an antenna on the tag. The signal picked up by the tag antenna induces an alternating current in the antenna which can be rectified by an RF diode and the rectified current can be used for a power supply for the electronic components. The tag antenna loading is changed by something that was to be measured, for example a microphone resistance in the cited patent. The oscillating current induced in the tag antenna from the incoming RF energy would thus be changed, and the change in the oscillating current led to a change in the RF power radiated from the tag antenna. This change in the radiated power from the tag antenna could be picked up by the base station antenna and thus the microphone would in effect broadcast power without itself having a self contained power supply. In the cited patent, the antenna current also oscillates at a harmonic of the carrier frequency because the diode current contains a doubled frequency component, and this frequency can be picked up and sorted out from the carrier frequency much more easily than if it were merely reflected. Since this type of tag carries no power supply of its own, it is called a "passive" tag to distinguish it from an active tag containing a battery. The battery supplies energy to run the active tag electronics, but not to broadcast the information from the tag antenna. An active tag also changes the loading on the tag antenna for the purpose of transmitting information to the base station.

The "rebroadcast" or "reflection" of the incoming RF energy at the carrier frequency is conventionally called "back scattering", even though the tag broadcasts the energy in a pattern determined solely by the tag antenna and most of the energy may not be directed "back" to the transmitting antenna.

In the 70's, suggestions to use tags with logic and read/write memories were made. In this way, the tag could not only be used to measure some characteristic, for example the temperature of an animal in U.S. Pat. No. 4,075,632 to Baldwin et. al., but could also identify the animal. The antenna load was changed by use of a transistor. A transistor switch also changed the loading of the transponder in U.S. Pat. No. 4,786,907 by A. Koelle.

Prior art tags have used electronic logic and memory circuits and receiver circuits and modulator circuits for receiving information from the base station and for sending information from the tag to the base station.

The continuing march of semiconductor technology to smaller, faster, and less power hungry has allowed enormous increases of function and enormous drop of cost of such tags. Presently available research and development technology will also allow new function and different products in communications technology.

One fundamental problem with passive tags is that the tag voltage fluctuates wildly as the distance between the tag and the base station changes. In particular, an unforseen and previously unrecognized problem arose in communication procedures where distortion of the tag signal occurred if the tag was close to the base station. The time when the antenna was shorted to produce a modulated signal received by the base station was much longer than the time when the antenna was not shorted, where the two times should be equal. The signal distortion increased the read errors to unacceptable levels. The signal distortion was not predicted by simulation of the tag circuitry.

RELATED PATENTS AND APPLICATIONS

This application claims priority from provisional application 60/100,719, filed Sep. 17, 1998.

Related U.S. Patents assigned to the assignee of the present invention include: U.S. Pat. Nos. 5,521,601; 5,528,222; 5,538,803; 5,550,547; 5,552,778; 5,554,974; 5,563,583; 5,565,847; 5,606,323; 5,635,693; 5,673,037; 5,680,106; 5,682,143; 5,729,201; 5,729,697; 5,736,929; 5,739,754; 5,767,789; 5,777,561; 5,786,626; 5,812,065; 5,821,859; 5,828,318; 5,831,532; 5,850,181; 5,874,902; 5,889,489; 5,909,176; and 5,912,632. U.S. Patent applications assigned to the assignee of the present invention include: application Ser. No. 08/694,606 filed Aug. 9, 1996 entitled RFID System with Write Broadcast Capability by Cesar et al.; application Ser. No. 09/153,617 filed 09/125/98, entitled RFID Interrogator Signal Processing System for Reading Moving Transponder, by Zai et al.; application Ser. No. 09/114,037 filed Jul. 10, 1998, entitled Apparatus and method for recovering data signal sent to RF tag, by Friedman et al., and; application Ser. No. 09/195,733 filed Nov. 19, 1998, entitled Charge sharing delay circuit for passive RF tags, by Friedman. The above identified U.S. Patents and U.S. Patent applications are hereby incorporated by reference

OBJECTS OF THE INVENTION

It is an object of the invention to produce an RF transponder comprising circuits which can be made at low cost. It is a further object of the invention to produce an RF transponder which can be used at high frequencies. It is a further object of the invention to produce an RF transponder with circuits which require very little current. It is a further object of the invention to produce an electronic chip for an RF transponder which can be produced simply with standard semiconductor manufacturing techniques. It is a further object of the invention to produce a passive RF transponder having signal protocols compensating for induced charges in the tag circuitry when the tag is modulating the antenna backscatter to communicate information from the tag to the base station.

SUMMARY OF THE INVENTION

The present invention is an apparatus which absorbs charge picked up on a passive RF tag mirror voltage line, so that the minor voltage line voltage varies little from design voltage as the tag modulates the tag antenna backscatter when the tag is in a strong RF field from a base station. An embodiment of the invention uses a capacitor having sufficient capacity to accept the charge and keep the mirror voltage within acceptable limits.

DETAILED DESCRIPTION OF THE INVENTION

In a communication procedure where a passive RF tag sends information to a base station by changing the load on the tag antenna with a modulation frequency $f_1$, an unexpected and previously unrecognized problem arose which becomes worse and worse as the tag and the base station are closer and closer together. The RF tag modulation relies on a tag oscillator having an oscillator frequency $f_2$ set by the base station as is explained in great detail in application Ser. No. 08/780,765, now U.S. Pat. No. 5,912,632 issued Jun. 15, 1999. A method and apparatus for recovery of RF signals is presented in application Ser. No. 09/114,037, filed by the present inventor Jul. 10, 1998. The above applications and patents are hereby incorporated by reference. The tag oscillator uses a defined current to charge a capacitor to a defined voltage, which then triggers a pulse to give a clock tick and to discharge the capacitor and restart the timing circuit. When the tag is close to the base station and the tag is receiving a lot of power into the tag antenna, the tag circuitry of the tag integrated circuit (IC) changing the load on the tag antenna causes major current surges to ground. When the current surges, electrical pickup occurs which dumps charges on to lines controlling the defined current which determines the clock ticks of the tag oscillator. Circuit simulation did not predict such a situation.

The effect of the current surges was to lengthen the time between clock ticks of the tag IC oscillator when the tag IC starts to short the tag antenna. The tag IC counts clock ticks when sending or receiving information in order to demodulate signals coming in or to modulate signals going out to the base station. If the time between clock ticks varies with the load the tag IC presents to the antenna, the length of time the tag antenna is loaded is different from the length of time that the tag antenna is unloaded, and the signal received by the base station will be distorted, and the time devoted to backscattering a full bit 1 will be different from that devoted to backscattering a full bit 0. The pulse width distortion makes the interpretation of the signal from the tag more difficult for the base station, and in typical noisy situations can lead to communication failure.

Figure 1:
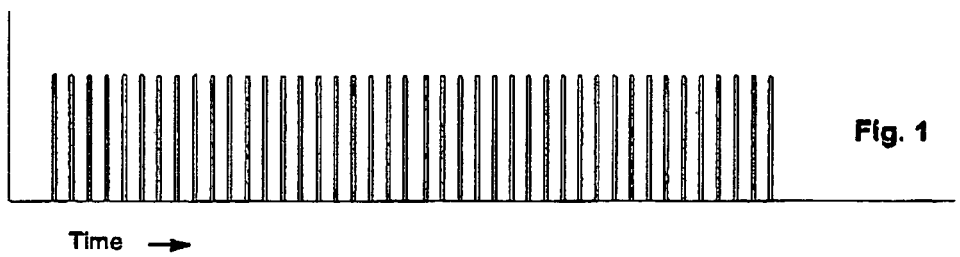
FIG. 1 sketches the expected output of the free running tag oscillator.
Figure 2:
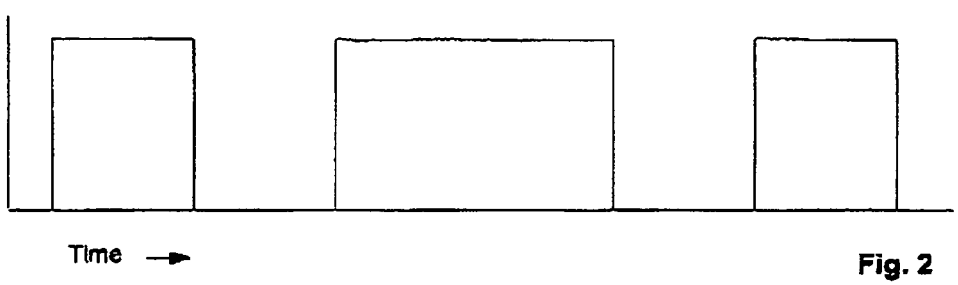
FIG. 2 shows a modulated signal using the output of the tag oscillator of FIG. 1.

FIG. 1 sketches the expected output of the free running tag oscillator, which produces sharp spikes of about 50 ns pulse length at a nominal frequency of about 8 times the modulation frequency that the base station has previously transmitted to the tag as explained in U.S. Pat. No. 5,912,632. (The width of the spikes are exaggerated in FIG. 1 for clarity in drawing.) The tag then modulates the antenna as shown for example in FIG. 2. Note that the tag oscillator has spikes equally spaced in FIG. 1 and that the on time of the modulation $t_1$ is the same time as the off time $t_2$ in FIG. 2. The double wide pulse width of the second pulse is twice $t_1$.

Figure 3:
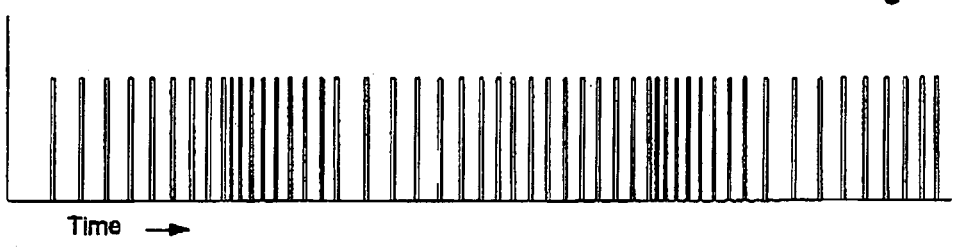
FIG. 3 shows the output of the tag oscillator when the tag is very close to the base station.
Figure 4:
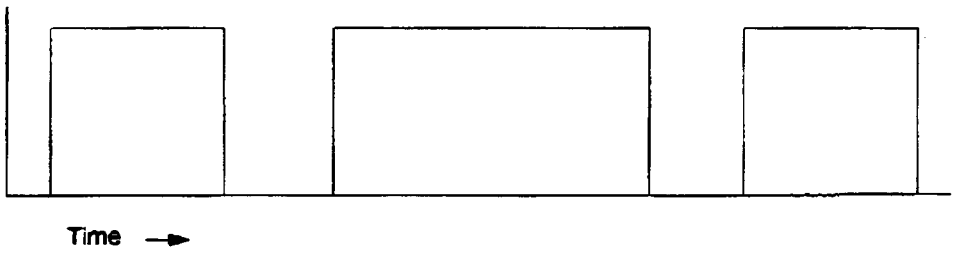
FIG. 4 shows a modulated signal using the output of the tag oscillator of FIG. 3.

When the tag is very close to the base station, however, the output of the tag oscillator resembled FIG. 3, with the resulting pulse shapes received by the base station shown in FIG. 4.

Figure 5:
FIG. 5 sketches VPMR in the for a tag oscillator signal of fig.

Measurements of the voltage difference between lines carrying the tag supply voltage VDD and the tag p mirror voltage VPMR showed a time history as sketched in FIG. 5, where the voltage excursion was about 20 mv about the expected steady voltage of about 0.8 volts. The current used to charge the capacitor controlling the tag oscillator has a non linear dependence on VPMR and VNMR, which explains the measurements sketched in FIGS. 3 and 4.

Figure 6:
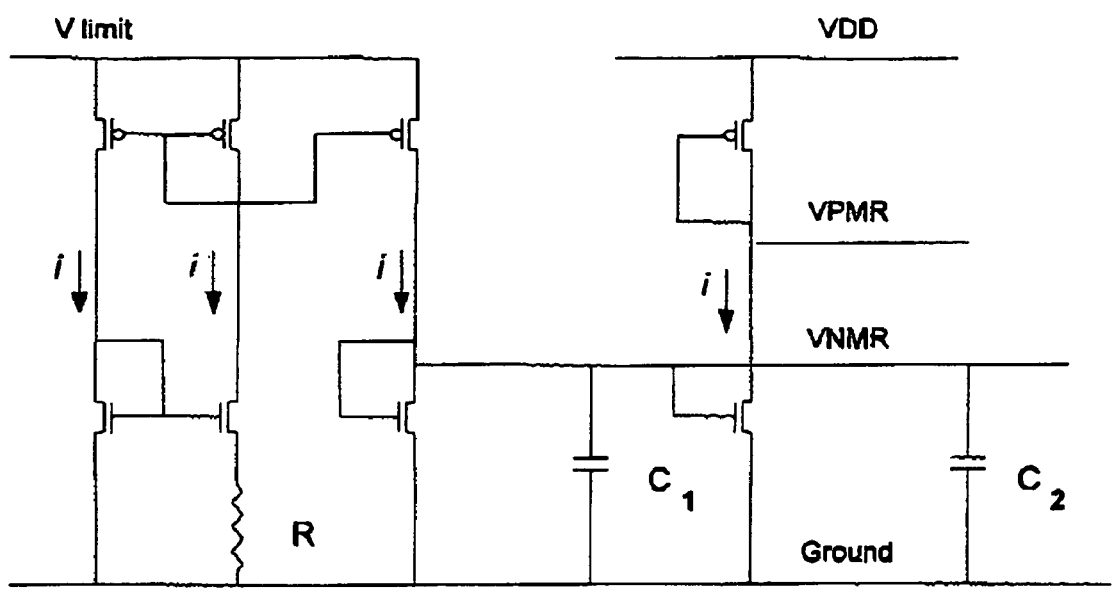
FIG. 6 shows the circuit of the invention.

The most preferred solution to the unanticipated problem noted above was to add capacitance to the mirror circuit producing VNMR and VPMR. FIG. 6 shows the circuit used, where $C_1$ is the capacitance previously used in the mirror circuit and $C_2$ is the capacitance added to reduce the fluctuation of the voltages VNMR and VPMR. VDD is the tag voltage which has been conditioned and smoothed, and VLIMIT is a tag voltage which has had less conditioning. The sizes of the transistors and R are chosen to produce a current i noted in FIG. 6. The capacitance $C_1$ had been chosen so that $C_1$ was approximately equal to $i/(f_1 \text{VPMR})$, so that the mirror nodes would charge up to a steady state mirror voltage in a time comparable to a single pulse of modulated power sent by the base station to the tag. In a typical set up, $C_1$ 10 pF, $f_1$=30 kHz, and VPMR=0.8 volts.

After the problem was identified, more capacitance $C_2$ was added to the circuit as noted in FIG. 6. Table 1 shows measurements taken when the tiny silicon chip containing the RF tag circuitry was closely attached to and wire bonded to various capacitors. (The tag worked much more consistently if the wire connections to an external capacitor attached to the chip were as short as physically possible). The first row gives results with no capacitor $C_2$ added, so that the total capacitance from the VPMR node to ground was equal to the capacitance of $C_1$ which was 10 pF.

Table I summarizes the measured distortion in the 3-2-1-2-3 portion of the start delimiter pattern sent by the tags to the base station at the beginning of the tag transmission. In order to compute the values in the table, we take 15 μsec as the ideal half-bit time (so an ideal pattern would be 45 μsec-30 μsec-15 μsec-30 μsec-45 μsec) and measure the percent distortion for each of the 5 symbols in the pattern (so a 40.5 μsec-31.5 μsec-15 μsec-24 μsec-54 μsec pattern would have a distortion pattern of −10% +5% 0% −20% +20%). Tables I and II show minimum, maximum, and the average of the absolute value of the distortion percentage per symbol.

TABLE I

| $C_2$ (pF) | minimum % | maximum % | average (% distortion) | # parts |
|---|---|---|---|---|
| 0 | −17.8 | +21.0 | 14.0 | 2 |
| 1.5 | −16.0 | +21.7 | 13.4 | 2 |
| 33 | −11.1 | +14.3 | 8.7 | 2 |
| 68 | −11.1 | +7.6 | 6.2 | 2 |
| 100 | −5.8 | +7 | 4.8 | 4 |
| 120 | −5.6 | 7 | 4.4 | 4 |

Table II shows results from tags with a 10,000 pF capacitors added to stabilize the VDD line. Clearly the distortion is not principally due to a drift in VDD during the transmission.

TABLE II

| | minimum % | maximum % | average (% distort) | # parts |
|---|---|---|---|---|
| 10,000 pF on VDD | −16.0 | +15.0 | 10.1 | 2 |

Tag response, base station decode, write, and write-OK performance over range and carrier frequency were measured. 120 pF, 100 pF, and 68 pF capacitors attached to the VNMR node result in perfect or near-perfect decode performance. The 33 pF capacitor does not provide quite enough correction for the decode algorithm chosen. A more sophisticated decode algorithm with added base station computation power could in fact decode the 33 pF capacitor signal received, and a yet more sophisticated and expensive decode algorithm could decode even the signal with the original 10 pF capacitor. The 1.5 pF results show that merely adding an external component is not sufficient to correct the problem and that the capacitance of the capacitor $C_2$ is critical if the simple decode algorithm is used These results clearly show that the unanticipated problem encountered may be solved relatively cheaply by using a capacitor between the mirror node and the relevant voltage node on the chip. In the case shown by the sketch of FIG. 1, the capacitor is connected between the VNMR node and the ground. It is anticipated by the inventors that the capacitor connected between the VDD node and VPMR would be equally as efficient at solving the problem The invention is not limited to a passive RF tag having current sources controlled by n mirror and p mirror circuits. The inventor anticipates the invention would work as well with cascade current mirrors (which sacrifice headroom to improve output impedance), with a Widlar current source, with a Wilson current source, and with other current sources that are known in the at. The above and other current sources are discussed in many textbooks on analog design. Two common references are Allen and Holberg, "CMOS Analog Circuit Design", and Gray and Meyer, "Analysis and Design of Analog Integrated Circuits".

An alternative to the above described method of compensation is described in copending application Ser. No. 09/195,733 entitled "Charge sharing delay circuit for passive RF tags", filed by the present inventor on Nov. 19, 1998, wherein the tag oscillator frequency is completely independent of fluctuations of the current mirror voltages. Other techniques to solve the anticipated problem are to measure the incoming power to the tag and speed up or slow down the tag oscillator accordingly.

Obviously, many modifications and variations of he present invention are possible in light of the above teachings. It is therefore to be understood that, within the scope of the appended claims, the invention may be practiced otherwise then as specifically described.

I claim:

1. A radio frequency (RF) transponder, comprising:
   an antenna;
   a modulation circuit operatively coupled to the antenna and including an oscillator and a controlled current source, the oscillator being responsive to the controlled current source in determining a tag modulation frequency used to modulate a load on the antenna; and
   a capacitor operatively coupled to the modulation circuit, wherein the capacitor is sufficiently large to stabilize the controlled current source against fluctuations that occur when the modulation circuit modulates the antenna.

2. The RF transponder of claim 1, wherein the controlled current source comprises a current mirror circuit providing a mirror voltage $V_m$.

3. The RF transponder of claim 2, wherein the capacitor is operatively coupled to a line carrying the mirror voltage $V_m$, and wherein the capacitor is sufficiently large that charges induced on the mirror voltage line change $V_m$ by less than 5% when the modulation circuit backscatter modulates the antenna.

4. The RF transponder of claim 3, where the capacitor is sufficiently large that charges induced on the mirror voltage line change $V_m$ by less than 2% when the modulation circuit backscatter modulates the antenna.

5. The RF transponder of claim 2, wherein capacitance C of the capacitor is greater than $2i/f_1 V_m$, wherein i is a characteristic current of the current mirror circuit and $f_1$ is the tag modulation frequency.

6. The RF transponder of claim 5, wherein capacitance C is greater than $3i/f_1 V_m$.

7. The RF transponder of claim 5, wherein capacitance C is greater than $5i/f_1 V_m$.

8. The RF transponder of claim 2, wherein capacitance C of the capacitor is selected such that the mirror voltage $V_m$ charges to a steady state level in a period of time comparable to a single pulse of modulated power received by the antenna.

9. The RF transponder of claim 2, wherein the mirror voltage $V_m$ further comprises a positive mirror voltage and a negative mirror voltage.

10. The RF transponder of claim 9, further comprising a rectification circuit operatively coupled to the antenna and providing a tag supply voltage, wherein the capacitor is coupled between the positive mirror voltage and the tag supply voltage.

11. The RF transponder of claim 9, wherein the capacitor is coupled between the negative mirror voltage and ground.

12. The RF transponder of claim 1, wherein the oscillator provides an oscillation frequency that is a multiple of the modulation frequency.

13. The RF transponder of claim 1, wherein the modulation circuit comprises a semiconductor chip and the capacitor comprises an external capacitor coupled to the semiconductor chip.

* * * * *